Dec. 25, 1951     H. W. JAHN ET AL     2,579,582
TANDEM AXLE VEHICLE
Filed Sept. 1, 1949     2 SHEETS—SHEET 2
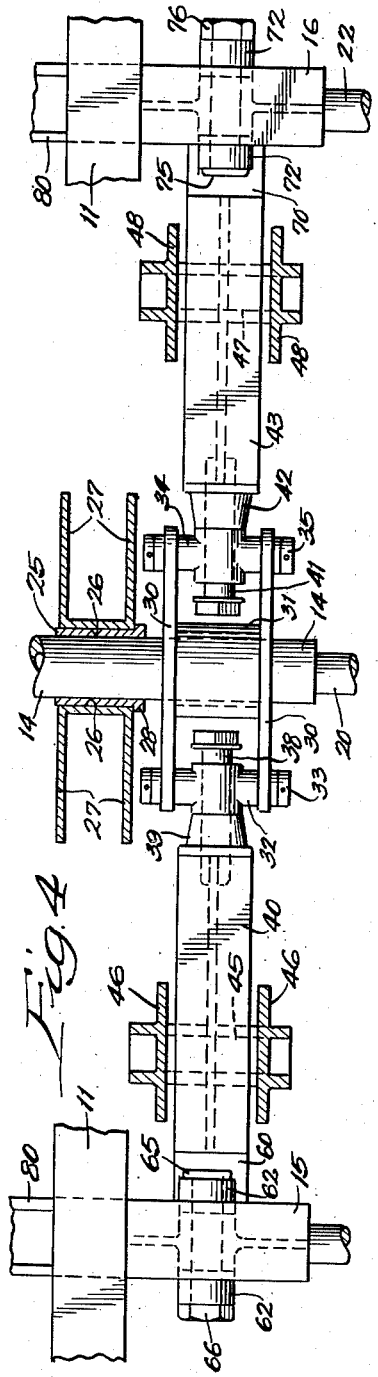
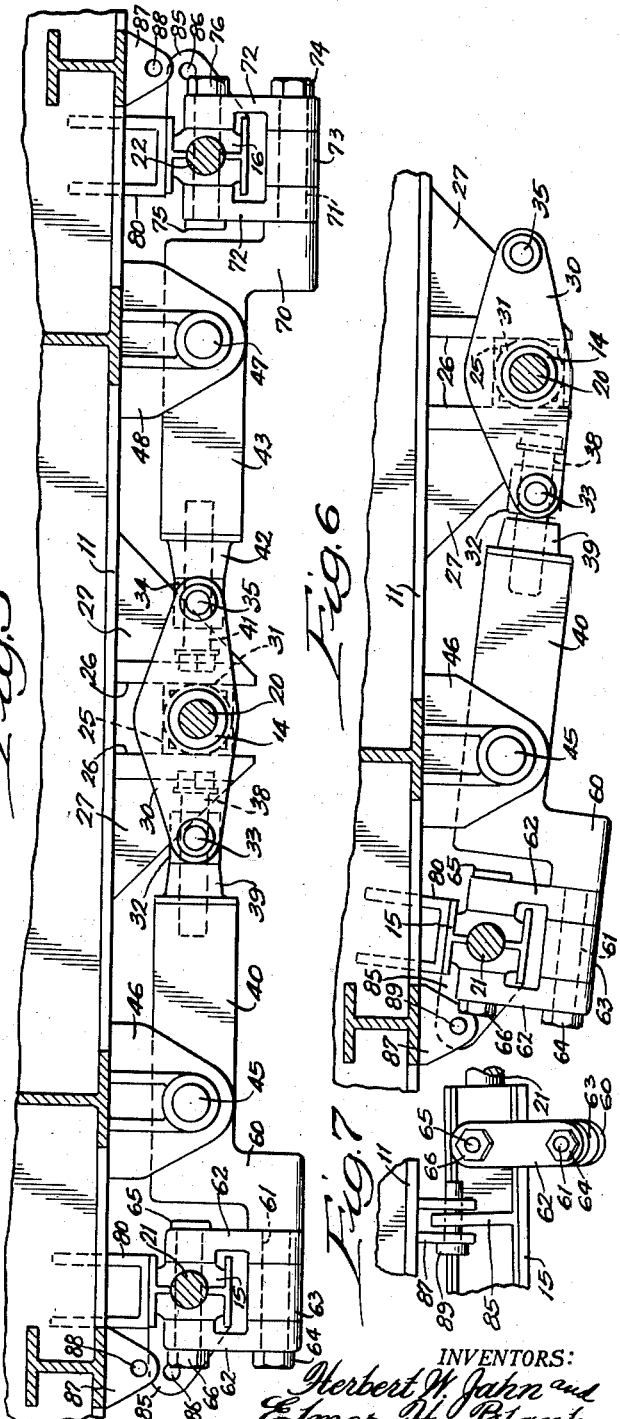
INVENTORS:
Herbert W. Jahn and
Elmer H. Blank.
BY Davison, Orms, Booth and Spangenberg
ATTORNEYS.

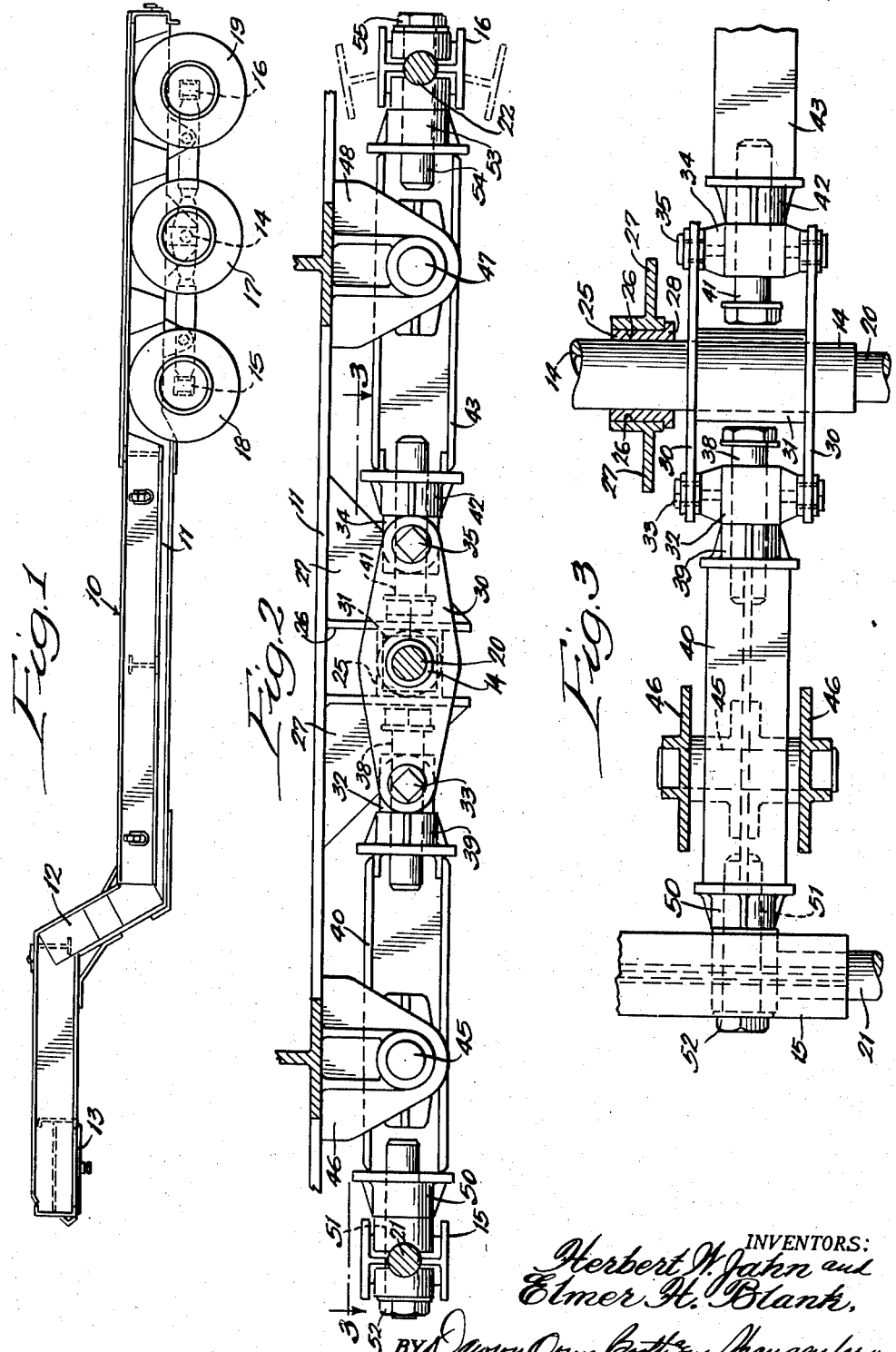

Patented Dec. 25, 1951

2,579,582

UNITED STATES PATENT OFFICE 2,579,582

TANDEM AXLE VEHICLE

Herbert W. Jahn and Elmer H. Blank, Savanna, Ill., assignors, by mesne assignments, to Pressed Steel Car Company, Inc., Chicago, Ill., a corporation of Pennsylvania Application September 1, 1949, Serial No. 113,542

3 Claims. (Cl. 280—104.5)

This invention is directed to tandem axle vehicles.

The principal object of this invention is to provide a tandem axle vehicle with three axles wherein each of the axles supports its own share of the load regardless of road irregularities.

In this respect, the frame of the vehicle carries two pairs of pivot brackets between the axles with the distances between the middle axle and the pairs of pivot brackets being substantially twice the distances between the end axles and the pairs of pivot brackets, and pairs of interconnected levers are carried by the pairs of pivot brackets and carry the axles. In this way substantially one-third of the load is carried by each axle regardless of road irregularities.

Preferably three pairs of levers are utilized, one pair of levers being connected to each axle, two pairs of the levers being pivotally connected to the two pairs of pivot brackets, and the third pair of levers being pivotally connected to the other two pairs of levers. Guide means are also preferably provided for the middle axle. The various connections between the levers and between the levers and axles are such as to permit tilting movement of the axles as well as vertical movement, both of which may be caused by road irregularities.

Further objects of this invention reside in the details of construction of the tandem axle vehicle and the cooperative relationship between the component parts thereof.

Other objects and advantages will become apparent to those skilled in the art upon reference to the accompanying specification, claims and drawings in which:

Fig. 1 is a side elevational view of a tandem axle vehicle in the form of a trailer;

Fig. 2 is an enlarged side elevational view partly in section of the tandem axle portion of the vehicle;

Fig. 3 is a horizontal sectional view taken substantially along the line 3—3 of Fig. 2;

Figure 4 is a horizontal sectional view similar to Fig. 3, but showing another form of the tandem axle arrangement;

Fig. 5 is a side elevational view partly in section of the tandem axle arrangement shown in Fig. 4;

Fig. 6 is a partial view similar to Fig. 5, but showing one of the axles located in inoperative position and Fig. 7 is a partial end elevational view looking from the left of Fig. 6.

The tandem axle vehicle of this invention is generally designated at 10 and it may be of any type including trucks, trailers, etc. For purposes of illustration in this application it is disclosed as a trailer. The tandem axle vehicle includes a frame 11 which may be of the drop platform type having a goose neck 12 and a suitable coupling 13.

The vehicle is provided with three tandem axles 14, 15 and 16 for carrying pairs of wheels 17, 18 and 19 respectively. Each wheel may be provided with two tires and thus the arrangement utilizes six wheels or 12 tires for supporting the load of the vehicle. The axles 14, 15 and 16 carry stub axles 20, 21 and 22 for rotatably mounting the wheels.

The axle 14 may take the form of a tube in which the stub axles are secured as by welding. The tube is provided with a pair of rectangular guides 25 which are vertically guided in slots 26 of a pair of brackets 27 suitably secured to the frame 11. The rectangular guides 25 may be formed of channels or angles welded together and to the tube 14. The guides 25 are also provided with flanges 28 to limit longitudinal movement of the axle 14 with respect to the brackets 27 and hence the frame 11. The guides 25, therefore, operate to permit vertical movement of the axle 14 and to permit tilting movement of the axle 14 in the vertical plane, but yet operate to prevent longitudinal movement of the axle.

The axle 14 rotatably carries a pair of levers each of which is composed of lever members 30 suitably secured together by a sleeve 31. In this respect the lever members 30 may be welded to the sleeve 31. The sleeve 31 may contain a bearing bushing so that the lever freely rotates on the axle 14.

One end of each lever 30 pivotally carries a fitting 32 by means of pivot pins 33 and likewise the other end of each lever 30 also carries a pivot fitting 34 by means of pivot pins 35. Each pivot fitting 32 slidably and rotatably receives a bolt 38 carried by the end 39 of a second lever 40. In a like manner each pivot fitting 34 slidably and rotatably carries a bolt 41 carried by the end 42 of a third lever 43.

The pair of levers 40 are pivoted by pivot pins 45 to a pair of brackets 46 suitably secured to the vehicle frame. In a like manner the third pair of levers 43 are pivoted by pivot pins 47 to a pair of pivot brackets 48 also carried by the frame.

The other ends 50 of each pair of levers 40 carry studs 51 which pivotally carry the axle 15, the axle 15 being held on the studs 51 by nuts 52.

The axle 15 is preferably fabricated from structural steel elements and has suitable bosses for receiving the stub axles 21 and the studs 51. By reason of the pivotal connection between the axle 15 and the pair of levers 40 tilting of the axle in substantially the vertical plane is permitted and since the pair of levers 40 are pivoted to the frame at 45 the axle 15 is allowed to move substantially vertically. In a like manner the other ends 53 of the pair of levers 43 pivotally carry the axle 16 by means of studs 54, the axle 16 being held on the studs 54 by nuts 55. The construction and operation of the axle 16 is substantially the same as that of the axle 15.

The distances between the axle 14 and the pivot brackets 46 and 48 is substantially twice the distance between the axles 15 and 16 and the pivot brackets 46 and 48. Thus, substantially two-thirds of the load of the vehicle transmitted through the pivot brackets 46 is distributed to the front axle 15 and substantially one-third distributed to the center axle 14. Likewise substantially two-thirds of the load of the vehicle transmitted through the pivot brackets 48 is distributed to the rear axle 16 and one-third to the middle axle 14. Thus, each axle carries its own share of the vehicle load. By reason of the three pairs of interconnected levers, each pair carrying an axle and two of the pairs being pivoted to the pivot brackets 46 and 48, the axles are permitted to move substantially vertically in the event of road irregularities. However, each axle at all times supports one-third of the load regardless of road irregularities. By reason of the pivotal connections between the pairs of levers and between the pairs of levers and the axles and by reason of a limited amount of looseness in these pivotal connections each axle is permitted to tilt in substantially a vertical plane further to compensate for road irregularities.

The form of the invention illustrated in Figs. 4 to 7 is substantially the same as that illustrated in Figs. 1 to 3 and like reference characters are utilized for like parts. The form of the invention illustrated in Figs. 4 to 7 differs from that illustrated in Figs. 1 to 3 in the manner of securing the axles 15 and 16 to the pairs of pivoted levers 40 and 43 respectively. The form of the invention illustrated in Figs. 4 to 7 permits freer tilting of the axles 15 and 16 with less looseness in the various pivotal connections. In this respect the forward ends of the pair of levers 40 are offset at 60 and each carries a stud 61. Each stud 61 carries a pair of straps 62 which are held spaced apart by a spacer 63. The straps 62 are retained on the studs 61 by nuts 64. The upper ends of the straps 62 are pivoted to the axle 15 by bolts 65 and nuts 66. There is thus provided a double pivotal connection between the pair of levers 40 and the axle 15.

In a like manner the rear axle 16 is carried by the pair of levers 43 through a double pivotal connection. In this respect the rear ends of the pair of levers 43 are offset at 70 and each end carries a stud 71 which in turn carries straps 72 held spaced apart by a spacer 73. Nuts 74 secure the straps 72 on the studs 71. The upper ends of the straps 72 are pivotally connected to the axle 16 by bolts 75 and nuts 76.

In order to prevent longitudinal movement of the axles 15 and 16 each axle is provided with a pair of guides 80 abutting against the inner portions of the frame 11. These guides permit vertical movement of the axles 15 and 16 and also tilting of the axles in a substantially vertical plane but prevent longitudinal movement of the axles.

Means are provided for rendering inoperative either or both of the axles 15 and 16. In this connection these axles carry a pair of brackets 85 provided with holes 86 which are adapted to be received between the two pairs of brackets 87 carried by the frame 11, the brackets 87 being provided with holes 88. In order to render the axle 15 inoperative it is elevated by a suitable jack until the holes 86 and 88 are aligned and then pins 89 are inserted in the holes. In this way the axle 15 may be raised off the road and held raised so that the load of the vehicle is carried by the axles 14 and 16. In a like manner the axle 16 may be elevated and maintained in an inoperative position. If both axles 15 and 16 are so rendered inoperative the load of the vehicle is carried solely by the axle 14.

While for purposes of illustration two forms of this invention have been disclosed, other forms thereof may become apparent to those skilled in the art upon reference to this disclosure, and therefore this invention is to be limited only by the scope of the appended claims.

We claim as our invention:

1. A mounting for the axles of a tandem axle vehicle having a main frame and three axles supporting the frame, said mounting comprising in combination, a pair of forward supporting members attached to said frame, a pair of rearward supporting members attached to said frame, a vertical guideway attached to said frame intermediate said pairs of supporting members, an intermediate axle mounted for guided tilting vertical movement in said guideway, a pair of first levers each journalled on one end of said intermediate axle and extending forwardly and rearwardly therefrom, a pair of forward levers pivotally mounted on said pair of forward supporting members, a front axle mounted on the forward ends of said pair of forward levers, a pair of rearward levers pivotally mounted on said pair of rearward supporting members, a rear axle mounted on the rearward ends of said pair of rearward levers, a connector pivotally mounted on each end of each of said pair of first levers, and a pin mounted on the rear end of each of said pair of forward levers and on the front end of each of said pair of rearward levers, said pins journalled for sliding movement in the respective connectors whereby a sliding pivotal joint is provided between said first levers and said forward and rearward levers.

2. A mounting for the axles of a tandem axle vehicle having a main frame and three axles supporting the frame, said mounting comprising in combination, a pair of forward brackets depending from said frame, a pair of rearward brackets depending from said frame, a vertical guideway attached to said frame intermediate said pairs of brackets an intermediate axle positioned for guided tilting vertical movement in said guideway, a pair of first levers each journalled on one end of said intermediate axle and extending forwardly and rearwardly therefrom an equal distance from the axial center thereof, a pair of forward supporting levers pivotally mounted on said pair of forward brackets, a front axle mounted on the forward ends of said pair of forward levers, a pair of rearward supporting levers pivotally mounted on said pair of rearward brackets, a rear axle mounted on the rearward ends of said pair of rearward levers, connector means pivotally mounted on each end of each of said pair of first levers, and a pin mounted on the rear end of each of said pair of forward levers and on the front end of each of said pair of rearward levers, said pins being mounted for sliding movement in the respective connector means whereby a sliding pivotal joint is provided between said first levers and said forward and rearward levers.

3. An axle mounting for tandem axle vehicles having a frame, said axle mounting comprising in combination, a pair of front brackets mounted on said frame, a pair of rear brackets mounted on said frame, a guideway mounted on said frame intermediate said brackets, a pair of guide members mounted in said guideway, a flange on each of said guide members adapted to abut said guideway, an intermediate axle mounted in said guide members for guided vertical movement with respect to said guideway, a pair of first levers each journalled on one end of said intermediate axle and extending forwardly and rearwardly therefrom an equal distance from the axial center thereof, a pair of forward supporting levers pivotally mounted on said pair of forward brackets, a front axle mounted on the forward ends of said pair of forward levers, a pair of rearward supporting levers pivotally mounted on said pair of rearward brackets, a rear axle mounted on the rearward ends of said pair of rearward levers, connector means pivotally mounted on each end of each of said pair of first levers, and a pin mounted on the rear end of each of said pair of forward levers and on the front end of each of said pair of rearward levers, said pins being mounted for sliding movement in the respective connector means whereby a sliding pivotal joint is provided between said first levers and said forward and rearward levers.

HERBERT W. JAHN.
ELMER H. BLANK.

REFERENCES CITED

The following references are of record in the file of this patent:

UNITED STATES PATENTS

| Number | Name | Date |
|---|---|---|
| 1,205,858 | Corcoran | Nov. 21, 1916 |
| 2,017,001 | Hocking | Oct. 8, 1935 |
| 2,188,654 | Favary | Jan. 30, 1940 |
| 2,391,948 | Couse | Jan. 1, 1946 |
| 2,491,994 | McFarlane | Dec. 20, 1949 |

FOREIGN PATENTS

| Number | Country | Date |
|---|---|---|
| 49,972 | Denmark | Mar. 4, 1935 |